(12) United States Patent
Wright et al.

(10) Patent No.: US 8,196,521 B2
(45) Date of Patent: Jun. 12, 2012

(54) LOCOMOTIVE POWER MODULE INSTALLATION AND REMOVAL

(75) Inventors: Jeffrey Holt Wright, Edelstein, IL (US); Matthew George Holl, East Peoria, IL (US); Matthew James Bartusek, Peoria Heights, IL (US); Suraaj Pal Bhatia, Peoria, IL (US)

(73) Assignee: Progress Rail Services Corp, Albertville, AL (US)

( * ) Notice: Subject to any disclaimer, the term of this patent is extended or adjusted under 35 U.S.C. 154(b) by 562 days.

(21) Appl. No.: 12/232,601

(22) Filed: Sep. 19, 2008

(65) Prior Publication Data

US 2010/0071585 A1    Mar. 25, 2010

(51) Int. Cl.
*B61C 17/04* (2006.01)

(52) U.S. Cl. ............... 105/140; 105/26.05; 105/377.01

(58) Field of Classification Search ............... 105/26.05, 105/35, 62.1, 133, 140, 377.01, 396, 401; 52/45–56; 296/208
See application file for complete search history.

(56) References Cited

U.S. PATENT DOCUMENTS

| | | | |
|---|---|---|---|
| 1,780,001 A | 10/1930 | Bruce | |
| 2,224,562 A | 12/1940 | Wolf | |
| 2,439,095 A | 4/1948 | Mitchell | |
| 2,666,497 A | 1/1954 | Weber | |
| 2,674,371 A | 4/1954 | Blackinton | |
| 2,977,900 A * | 4/1961 | Farrar | 105/377.01 |
| 3,116,700 A | 1/1964 | Aydelott | |
| 3,194,525 A | 7/1965 | Webb | |
| 3,752,083 A | 8/1973 | Bitterberg | |
| 3,771,293 A | 11/1973 | Vest | |
| 3,789,747 A | 2/1974 | Wasserman et al. | |
| 4,134,535 A | 1/1979 | Barthels et al. | |
| 4,186,665 A * | 2/1980 | de Jong et al. | 105/456 |
| 4,407,203 A | 10/1983 | Harbin et al. | |
| 4,506,757 A | 3/1985 | Matsumoto et al. | |
| 4,609,126 A | 9/1986 | Janda | |
| 4,770,427 A | 9/1988 | Howell et al. | |
| 5,765,329 A | 6/1998 | Huang | |
| 5,950,753 A | 9/1999 | Muldoon et al. | |
| 6,042,696 A * | 3/2000 | Roy et al. | 202/117 |
| 6,397,965 B1 | 6/2002 | McFarlane et al. | |
| 7,392,749 B2 | 7/2008 | Bendig et al. | |

(Continued)

FOREIGN PATENT DOCUMENTS

JP      2003254080      *   3/2002

OTHER PUBLICATIONS http://web.archive.org/web/20061114095417/http://www.power-technology.com/contractors/gensets/kirloskar/kirloskar1.html website published on Nov. 14, 2006.*

(Continued)

*Primary Examiner* — S. Joseph Morano
*Assistant Examiner* — Zachary Kuhfuss
(74) *Attorney, Agent, or Firm* — Finnegan, Henderson, Farabow, Garrett & Dunner LLP

(57) ABSTRACT

A power module for a locomotive is disclosed. The power module may have a frame including a plurality of lifting elements. The plurality of lifting elements may include at least one fork lifting element and at least one frame lifting eye. The power module may further have a generator set supported by the frame.

19 Claims, 6 Drawing Sheets

U.S. PATENT DOCUMENTS

| | | | |
|---|---|---|---|
| 2004/0149159 | A1 | 8/2004 | Foesel et al. |
| 2004/0188433 | A1* | 9/2004 | Morales et al. ............. 220/1.5 |
| 2006/0091832 | A1* | 5/2006 | Donnelly et al. ............ 318/108 |
| 2007/0134104 | A1* | 6/2007 | Husted ........................ 417/360 |
| 2009/0101041 | A1* | 4/2009 | Burns et al. ................... 105/35 |

OTHER PUBLICATIONS

Union Pacific Acquiring 60 New Generation Environmentally Friendly Locomotives for Los Angeles Basin Rail Yards, *News Releases*, Feb. 9, 2006.

Multi-Engine GenSet Ultra Low Emissions Road-Switcher Locomotive, National Railway Equipment Co., printed from the Internet on Sep. 9, 2008, pp. 1-22.

U.S. EPA Region 5 "Tools & Incentives for Green Diesel Technology," Railroad Industry Overview, Sep. 6, 2006, pp. 1-23.

Ultra-Low Emissions "Genset" Switchers, CARB hearing, Jul. 13, 2006, pp. 1-15.

Sequential Diesel "Genset" Locomotive Rosters Railpower; NRE, MotivePower and other builders, J. Moore, Apr. 6, 2008, pp. 1-23.

Low Emissions Locomotive Spotter's Guide, J. Moore, Jun. 8, 2007, pp. 1-27.

Multi Gensets Locomotives for Canadian Railways, Railpower, May 2007, pp. 1-34.

Low-Emissions Multiple Engine, Genset Locomotive Rosters, Timbertimes, printed from the Internet on Sep. 9, 2008, pp. 1-10.

"Railroad Perspective on Locomotive Exhaust Aftertreatment & Technology—From idea to market: technology successes & limitations," Iden, Nov. 28, 2007, pp. 1-11.

"The N-viroMotive Product Line: Multi-Engine GenSet Ultra Low Emissions Road-Switcher Locomotives," National Railway Equipment Co., printed from the Internet on Sep. 9, 2008, pp. 1-17.

\* cited by examiner

LOCOMOTIVE POWER MODULE INSTALLATION AND REMOVAL

TECHNICAL FIELD

The present disclosure relates generally to a power module for a locomotive and, more particularly, to features aiding power module installation and removal.

BACKGROUND

Mobile machines are known to include a power system for generating power. For example, a power system is known to include one or more electric motors, one or more generator units, and a power-transfer system for transferring power from the one or more generator units to the one or more electric motors. It is known for a generator unit to include an engine driving a generator to produce electricity for the power system, for example, to provide power to be transferred to the one or more electric motors through the power-transfer system.

Often, at least a portion of the power system (e.g., a generator unit) is enclosed within a housing of the mobile machine, for example, to protect the power system from environmental elements. In order to service, inspect, and/or repair the power system of the mobile machine, at least a portion of the mobile machine's housing is often moved to gain sufficient access to the power system. Gaining access to the power system by moving at least a portion of the machine's housing may be labor intensive and time consuming.

It is known to include at least a portion of the power system (e.g., generator unit) in an interchangeable power module. In such a power module, it is known to position the power system within a container and provide connection lines (e.g., mechanical and electrical lines) to connect the power module to the mobile machine.

One example of a module including a generator set for a locomotive is described in Published U.S. Patent Application No. US 2004/0149159 A1 to Foesel et al. (the '159 application). The '159 application discloses a diesel-electric locomotive including a replaceable assembly including a diesel engine and a generator. The assembly is connected to a drive unit and housed within a container. Further, connecting devices are arranged on the container to connect mechanical and electrical devices of the module to components of the locomotive. The container is moved with a crane.

Although the assembly of the '159 application may alleviate some of the problems associated servicing a diesel-electric locomotive, other problems persist. The system disclosed by the '159 application may be inefficient because it only provides a single type of lifting element on the module for use by a corresponding type of lifting machine.

SUMMARY

In one aspect, the present disclosure is directed to a power module for a locomotive. The power module may include a frame including a plurality of lifting elements. The plurality of lifting elements may include at least one fork lifting element and at least one frame lifting eye. The power module may further include a generator set supported by the frame.

In another aspect, the present disclosure is directed to a method of servicing a power module for a locomotive. The power module may include a generator set. The method may include the step of disconnecting an enclosure covering the generator set from a frame of the power module, the enclosure including a plurality of walls and a roof structure. The method may further include moving the enclosure relative to the frame as a single unit including the plurality of walls and the roof structure.

DETAILED DESCRIPTION

Figure 1:
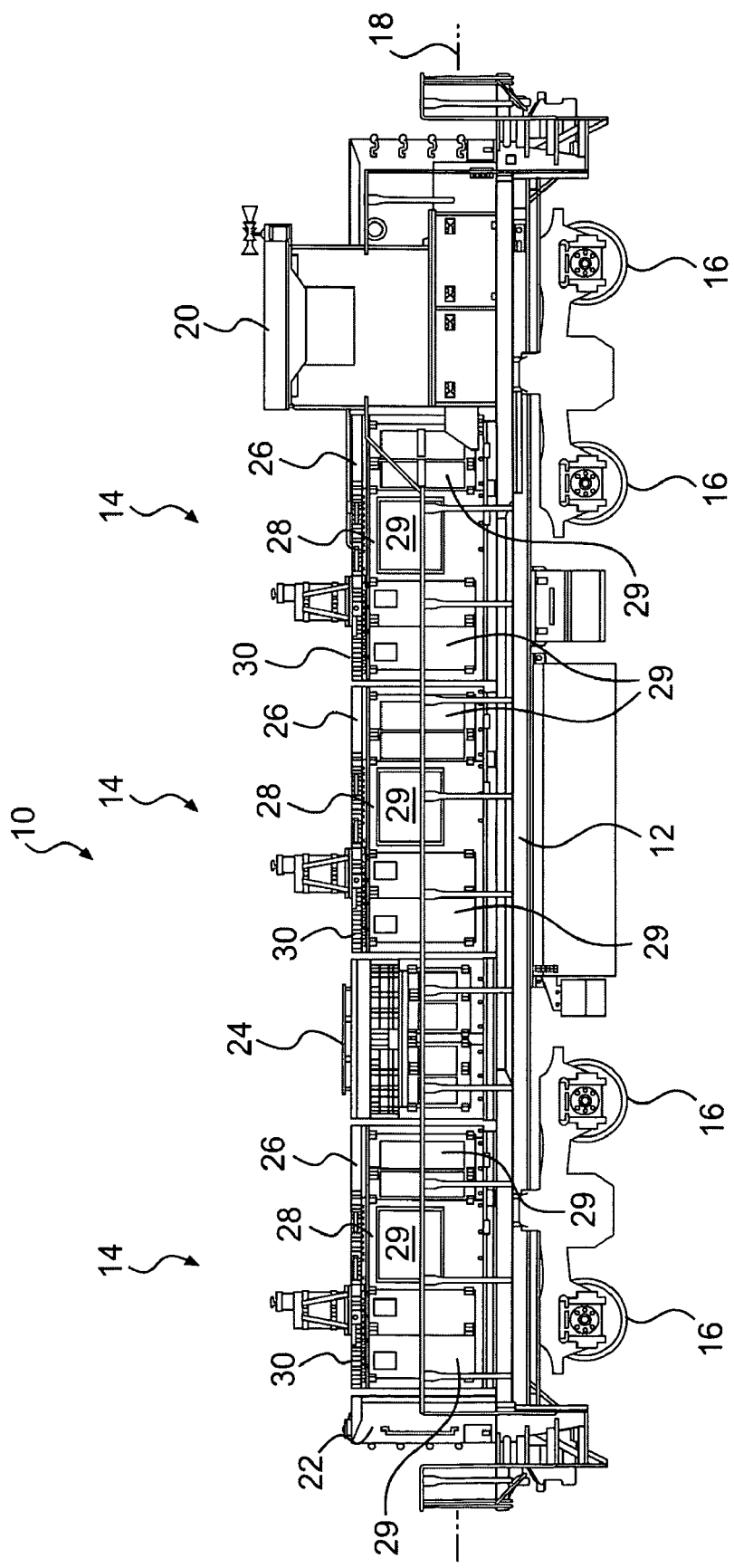
FIG. 1 is a side view of an exemplary locomotive including a plurality of power modules mounted thereon, in accordance with the present disclosure.

FIG. 1 illustrates a locomotive 10 including a platform 12 for supporting one or more power modules 14. Any number of power modules 14 sufficient to power locomotive 10 may be utilized. Each power module 14 may produce power that may be transferred, for example, to one or more traction motors (not shown) to drive wheels 16. In an exemplary embodiment shown in FIG. 1, locomotive 10 may include three power modules 14 aligned on platform 12 along a longitudinal axis 18 that extends substantially in the direction of travel of locomotive 10. Locomotive 10 may also include an operator's cabin 20 mounted forward of power modules 14 and a sandbox 22 mounted rearward of power modules 14. It is also contemplated that one or more components, such as a dynamic brake assembly 24, may be positioned between two power modules 14.

Each power module 14 may be at least partially covered by an enclosure 26. It is contemplated that enclosure 26 may include a plurality of walls 28 and a roof structure 30. In an exemplary embodiment, the plurality of walls 28 may include four walls. In other words, enclosure 26 may surround four sides and a top of power module 14. Further, walls 28 may include one or more wall access passages 29 for permitting an operator access into enclosure 26 and/or for permitting an intake of air into enclosure 26. It is contemplated that enclosure 26 may include various types of covers for covering a corresponding wall access passage 29 including, for example, solid surface covers (e.g., hinged panel doors) for providing operator access and/or perforated surface covers (e.g., mesh screens and louvers) for permitting air flow.

Figure 2:
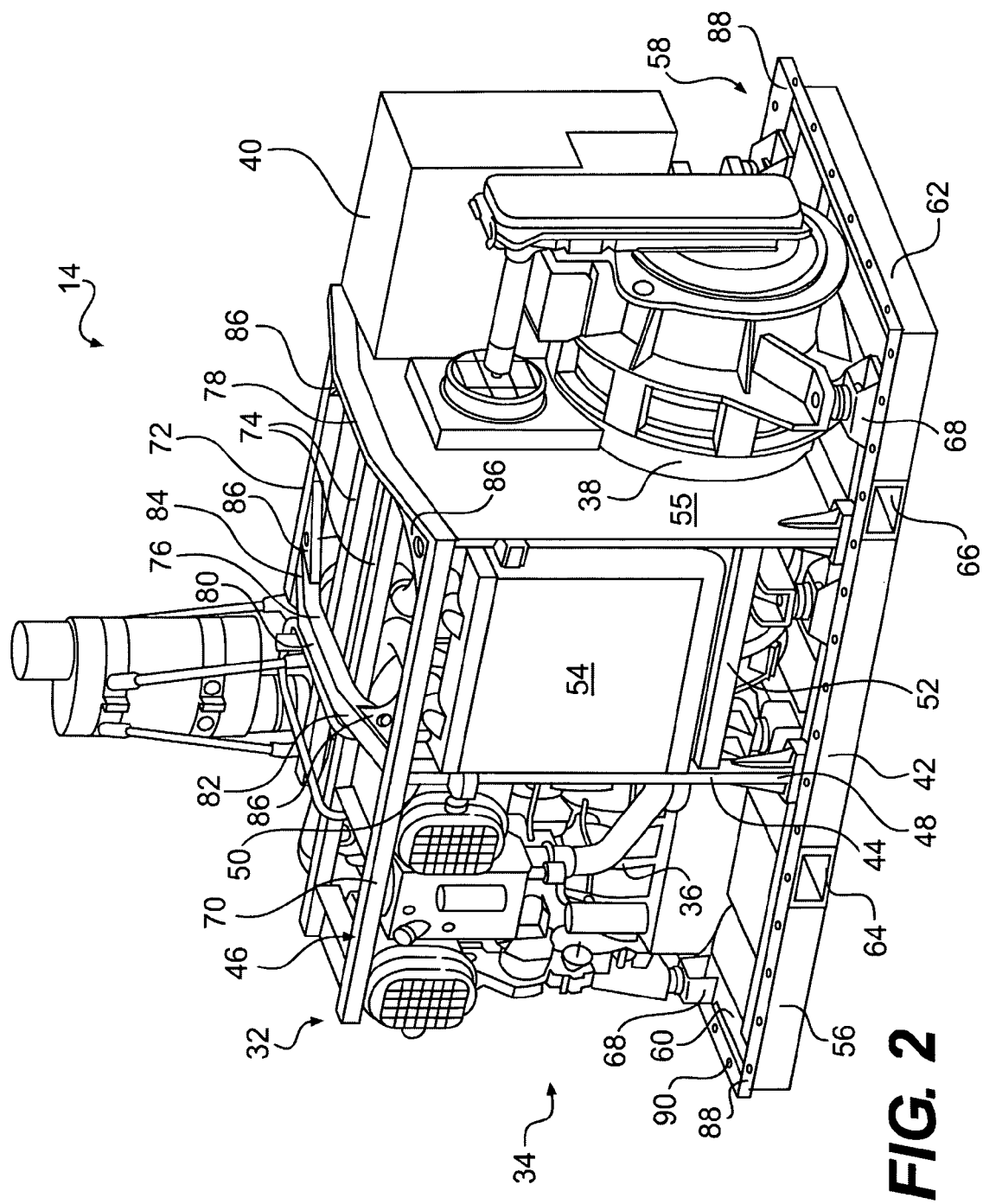
FIG. 2 is a diagrammatic illustration of one of the power modules of FIG. 1.

FIG. 2 shows one of power modules 14 with enclosure 26 removed. Power module 14 may include a frame 32 that may provide structural rigidity for supporting at least a portion of a power system including, for example, a generator set 34. In an exemplary embodiment, generator set 34 may include an engine 36 configured to drive a generator 38. Further, generator set 34 may include one or more auxiliary components 40 (e.g., a radiator, a rectifier, an engine/generator coupling, and an aftercooler).

Frame 32 may include various structural elements including a base structure 42, vertical supports 44, and a top structure 46. A lower end 48 of each vertical support 44 may be attached to base structure 42, and top structure 46 may be attached at a top end 50 of each vertical support 44. It is contemplated that frame 32 may include additional supports for adding structural rigidity or otherwise supporting one or more components of generator set 34. For example, frame 32 may include a cross brace 52 for supporting an aftercooler 54.

Base structure 42 may include a plurality of longitudinal supports including, for example, a first base longitudinal support 56 and a second base longitudinal support 58. Base structure 42 may also include a plurality of transverse supports including, for example, a first end base support 60 and a second end base support 62. Further, base structure 42 may also include one or more interior transverse supports including features for facilitating lifting of power module 14, for example, one or more fork lifting elements. The one or more fork lifting elements may include a first fork tube 64 and a second fork tube 66. While the fork lifting elements are described and shown as tubes, it is also contemplated that the fork lifting elements may be any shape or configuration sufficient to receive a prong of a forklift (not shown). Fork lifting elements may alternatively include channels, for example, having a substantially U-shape.

Each transverse support (e.g., first and second base end supports 60, 62; first and second fork tubes 64, 66) may extend from first base longitudinal support 56 to second base longitudinal support 58. It is contemplated that generator set 34 may be positioned on base structure 42 on one or more resilient mounts 68 to absorb vibrations. It is also contemplated that frame 32 may be connected to platform 12 by any number or type of fasteners sufficient to secure power module 14 to locomotive 10. In an exemplary embodiment, frame 32 may be fastened to platform 12 via base structure 42 at four mounting locations with two bolts per mounting location (not shown).

Top structure 46 may include a plurality of longitudinal supports, for example, a first top longitudinal support 70 and a second top longitudinal support 72. It is contemplated that top structure 46 may include additional longitudinal supports, for example, one or more interior longitudinal supports 74. Top structure 46 may include a plurality of transverse supports including, for example, a first top transverse support 76 and a second top transverse support 78. It is contemplated that first and second top transverse supports 76, 78 may include a shape that is substantially arched, for example, to provide additional rigidity to roof structure 30 of power module 14. Moreover, the shape of first and second top transverse supports 76, 78 may correspond with a substantially arched shape of roof structure 24 and may be formed by a horizontal portion 80, a first angled portion 82, and a second angled portion 84.

Top structure 46 may include one or more frame lifting eyes 86. It is contemplated that each frame lifting eye 86 may be positioned on top structure 46 in a location that may allow a lifting machine, for example, an overhead lift (not shown), to engage frame lifting eyes 86 to lift and move power module 14. The overhead lift may be any type of overhead lift sufficient to lift power module 14, such as a crane. As in the exemplary embodiment shown in FIG. 2, top structure 46 may include four frame lifting eyes 86. Each frame lifting eye 86 may include a passage 87 formed in a plate 89 for connecting to a lifting machine (best shown in FIG. 5). It is contemplated that each passage 87 may have any shape sufficient to permit a lifting machine to securely engage frame 32, including, for example, a circular shape or an oval shape. Two frame lifting eyes 86 may be positioned along first top longitudinal support 70 adjacent first and second transverse supports 76, 78, respectively. Likewise, two additional frame lifting eyes 86 may be positioned along second top longitudinal support 72 adjacent first and second transverse supports 76, 78, respectively.

Thus, frame 32 may include two separate sets of lifting elements (e.g., fork tubes 64, 66 and frame lifting eyes 86) for use in moving power module 14 via different types of lifting machines, for example, the forklift and the overhead lift. First, power module 14 may be moved, for example, by engaging the forklift to first and second fork tubes 64, 66. It is contemplated that elements on locomotive 10 that may interfere with the use of the forklift (e.g., handrails) may be temporarily removed. Alternatively, power module 14 may be moved by the overhead lift using frame lifting eyes 86. It is contemplated that a particular type of lifting machine may not engage the other type of lifting element. For example, the overhead lift may not engage fork tubes 64, 66 and the forklift lift may not engage frame lifting eyes 86.

Frame 32 may include a fastening rail 88 for attaching enclosure 26 to frame 32. It is contemplated that fastening rail 88 may be mounted on base structure 42 and include a plurality of holes 90 for receiving fasteners (not shown) that may secure one or more of walls 28 of enclosure 26 to frame 32. It is also contemplated that enclosure 26 may be fastened to frame 32 at additional locations, for example, at top structure 46. Walls 28 and roof structure 30 may also include one or more enclosure structural elements (not shown) to facilitate fastening walls 28 and roof structure 30 to each other and/or to provide additional structural rigidity to enclosure 26. The enclosure structural elements may be integral with walls 28 and roof structure 30 and formed, for example, by bending one or more edges of walls 28 and roof structure 30. Alternatively, the enclosure structural elements may be non-integral and be may be fastened to walls 28 and roof structure 30. Since walls 28 and roof structure 30 may be directly fastened to each other, enclosure 26 may be installed or removed from frame 32 as a single unit. That is, after walls 28 and roof structure 30 are disconnected from frame 32 (e.g., at fastening rail 88), walls 28 and roof structure 30 may remain connected to each other as a single unit and supported by the enclosure structural elements to permit enclosure 26 to be lifted from frame 32 to expose generator set 34.

Figure 3:
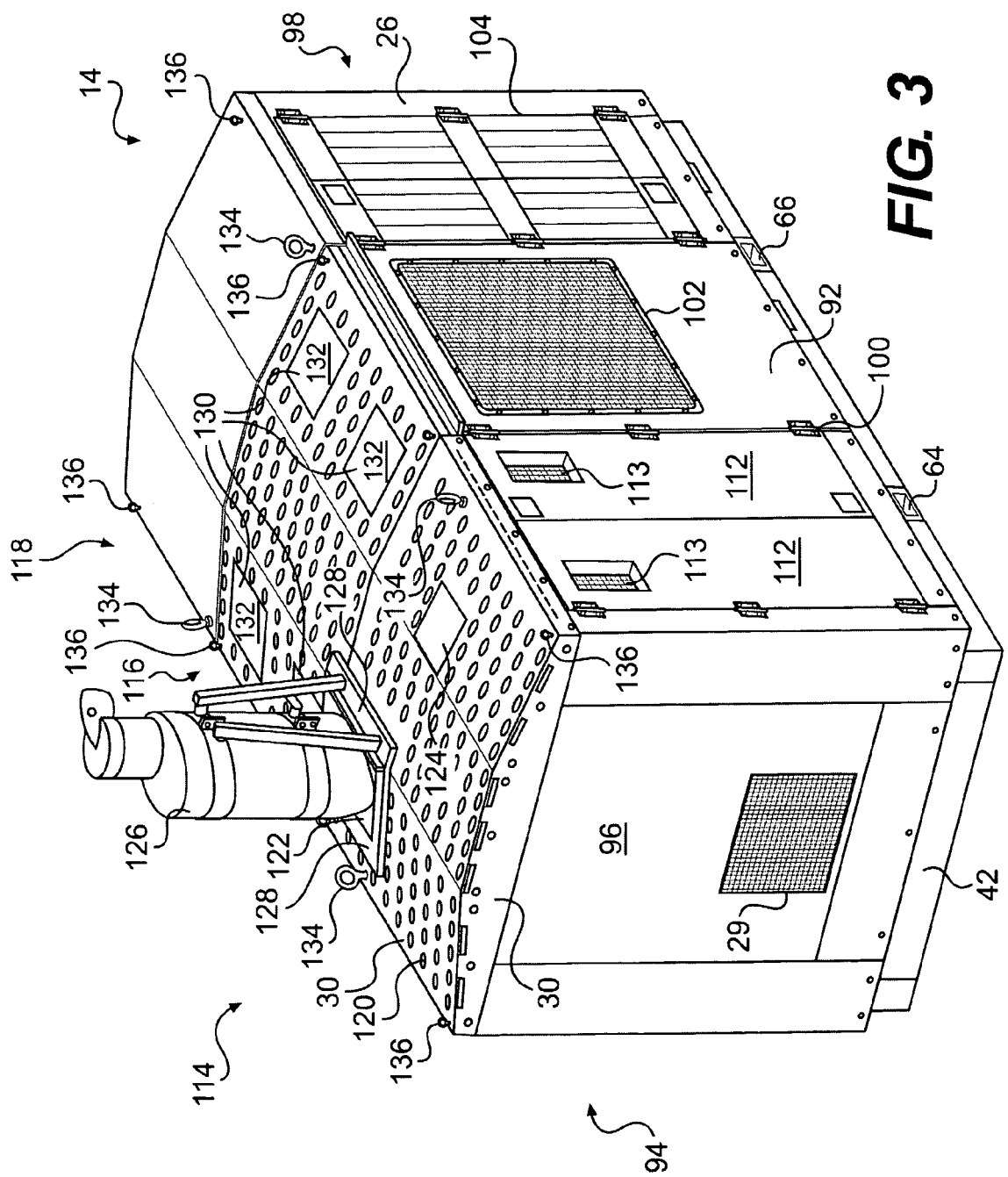
FIG. 3 is a diagrammatic illustration of the power module of FIG. 1 including an exemplary enclosure in a view from a direction towards a first longitudinal wall of the enclosure.
Figure 4:
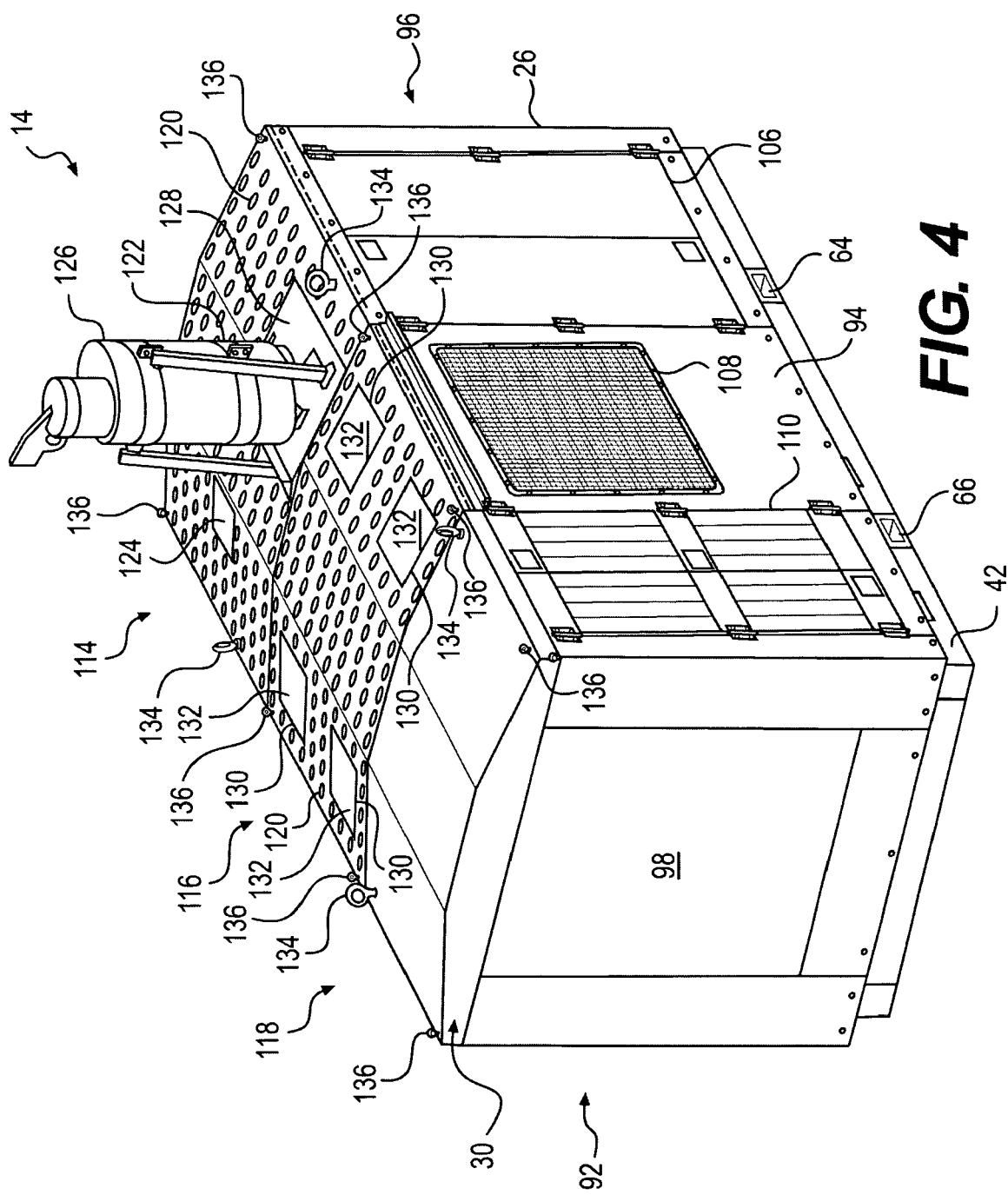
FIG. 4 is a diagrammatic illustration of the power module of FIG. 1 including the exemplary enclosure in a view from a direction towards a second longitudinal wall of the enclosure.

As shown in FIGS. 3 and 4, enclosure 26 may include four walls 28 including, for example, a first longitudinal wall 92 opposite a second longitudinal wall 94, and a first end wall 96 opposite a second end wall 98. In an exemplary embodiment, each wall 92, 94, 96, 98 may be formed from sheet metal and may be removably fastened to an adjacent wall 92, 94, 96, 98 and/or roof structure 30 via the enclosure structural elements (e.g., formed by bending an edge of the sheet metal) with one or more fasteners (not shown). Walls 92, 94, 96, 98 may be removed from frame 32 while fastened to each other. Alternatively, one or more walls 92, 94, 96, 98 may be separately removed from enclosure 26.

As shown in FIG. 3, each of walls 92, 94, 96, 98 may include one or more wall access passages 29 therethrough. For example, wall 92 may include a first engine access passage 100, an aftercooler access passage 102, and a generator air inlet access passage 104. Likewise, as shown in FIG. 4, wall 94 may include one or more wall access passages 29 including, for example, a second engine access passage 106, a radiator access 108, and a rectifier access passage 110. It is contemplated that one or more of access passages 100, 102, 104, 106, 108, 110 may be covered, for example by one or more solid surface covers and/or perforated surface covers (e.g., screens or louvers). For example, first engine passage 100 may be covered by a pair of hinged doors 112. Each of hinged doors 112 may include an engine air intake screen 113 (e.g., wire-mesh type material) for permitting air intake into engine 36.

Roof structure 30 may also include a plurality of removable sections fastened to each other, for example, by one or more fasteners (not shown). For instance, roof structure 30 may include a first end roof section 114, a central roof section 116, and a second end roof section 118. That is, first end roof section 114 may cover a first end of power module 14 adjacent first end wall 96. Central roof section 116 may cover a central portion of power module 14. Second end roof section 118 may cover a second end of power module 14 adjacent second end wall 98. Central roof section 116 may be positioned between each of first end roof section 114 and second end roof section 118. One or more roof sections 114, 116, 118 may include a plurality of cooling pathways 120. It is contemplated that cooling pathways 120 may help dissipate heat produced by generator set 34 within enclosure 26.

Each of roof sections 114, 116, 118 may also include one or more roof access passages to access additional components of power module 14. For example, first end roof section 114 may include an exhaust access passage 122 and a hydraulic reservoir vent access passage 124. Exhaust access passage 122 may permit an exhaust system including, for example, an exhaust stack 126 to pass through roof structure 30. Exhaust access passage 122 may have a large cross-section with sufficient clearance to allow exhaust stack 126 to pass through roof structure 30. Roof structure 30 may include one or more removable exhaust shields 128 to block or otherwise limit environmental elements from penetrating exhaust access passage 122.

Figure 5:
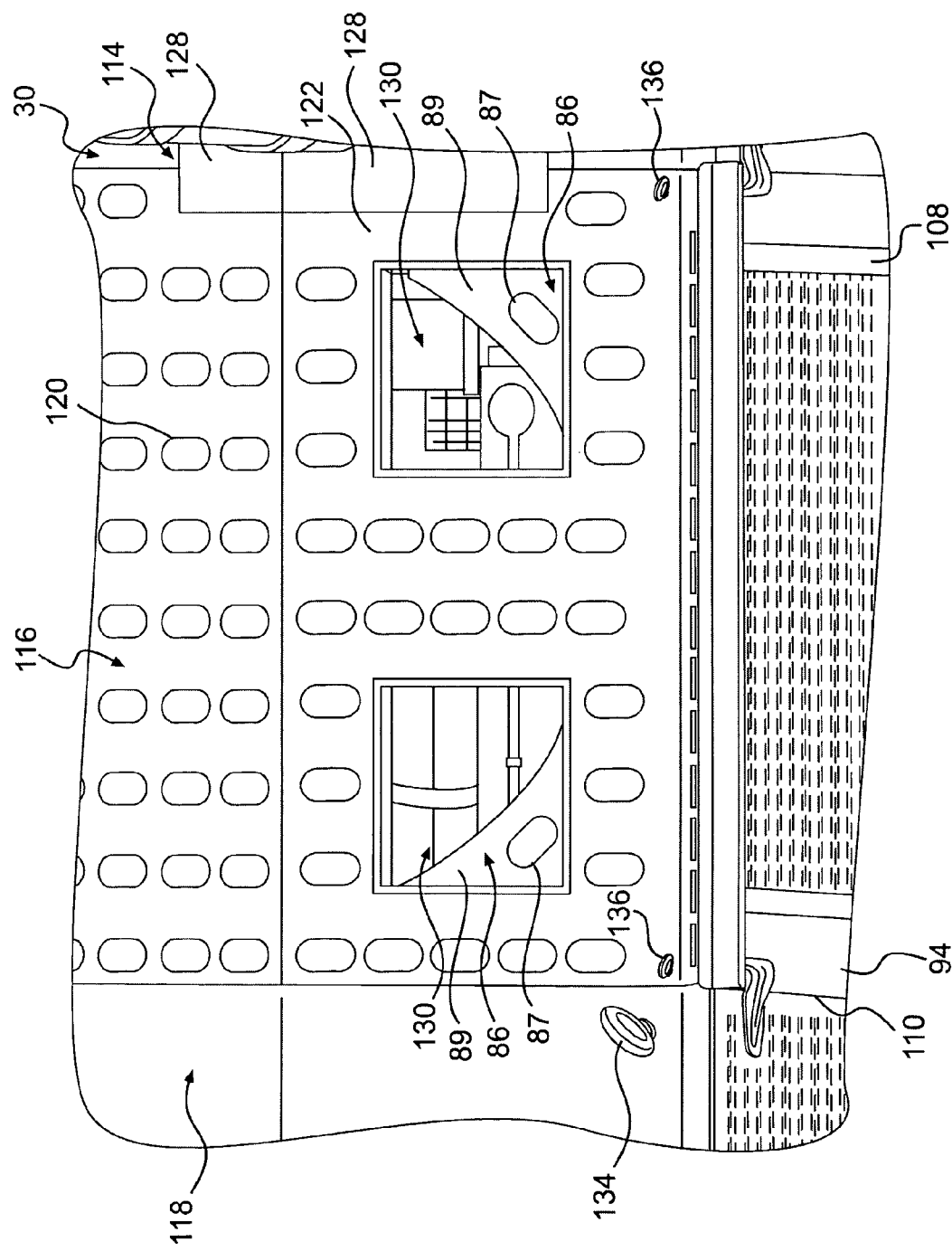
FIG. 5 is a diagrammatic illustration of two exemplary frame access passages within a roof structure of the enclosure for accessing frame lifting eyes.

As best shown in FIGS. 3 and 4, central roof section 116 may include a plurality of frame access passages 130, each covered, for example, by a corresponding frame access door 132, which may be pivotally attached to roof structure 30. Each frame access passage 130 may provide access within enclosure 26. In an exemplary embodiment, roof structure 30 may include four frame access passages 130 to provide access to top structure 46 of frame 32. Each frame lifting eye 86 may be accessible via a corresponding frame access passage 130. It is contemplated that a lifting machine (e.g., the overhead lift) may attach to each frame lifting eye 86 through each corresponding frame access passage 130 to lift and move power module 14 (FIG. 5).

As best shown in FIGS. 3 and 4, roof structure 30 may include a plurality of sets of lifting eyes to facilitate removal of one or more portions of enclosure 26. For example, a plurality of enclosure lifting eyes 134 may be fastened to roof structure 30. In the exemplary embodiment, roof structure 30 may include four enclosure lifting eyes 134 for lifting either roof structure 30 in its entirety (e.g., roof sections 114, 116, 118) or enclosure 26 in its entirety (e.g., roof structure 30 and four walls 28) from frame 32. It is also contemplated that each roof section 114, 116, 118 may include a set of roof section lifting points defined by one or more roof section lifting eyes 136 and/or one or more enclosure lifting eyes 134. For example, a set of roof section lifting points of central roof section 116 may include four roof section lifting eyes 136. Alternatively, a set of roof section lifting points of each of first end roof section 114 and second end roof section 118 may include two roof section lifting eyes 136 and two enclosure lifting eyes 134. It is contemplated that enclosure lifting eyes 134 may be stronger than roof section lifting eyes 136, in order to permit enclosure lifting eyes 134 to carry a larger load.

Figure 6:
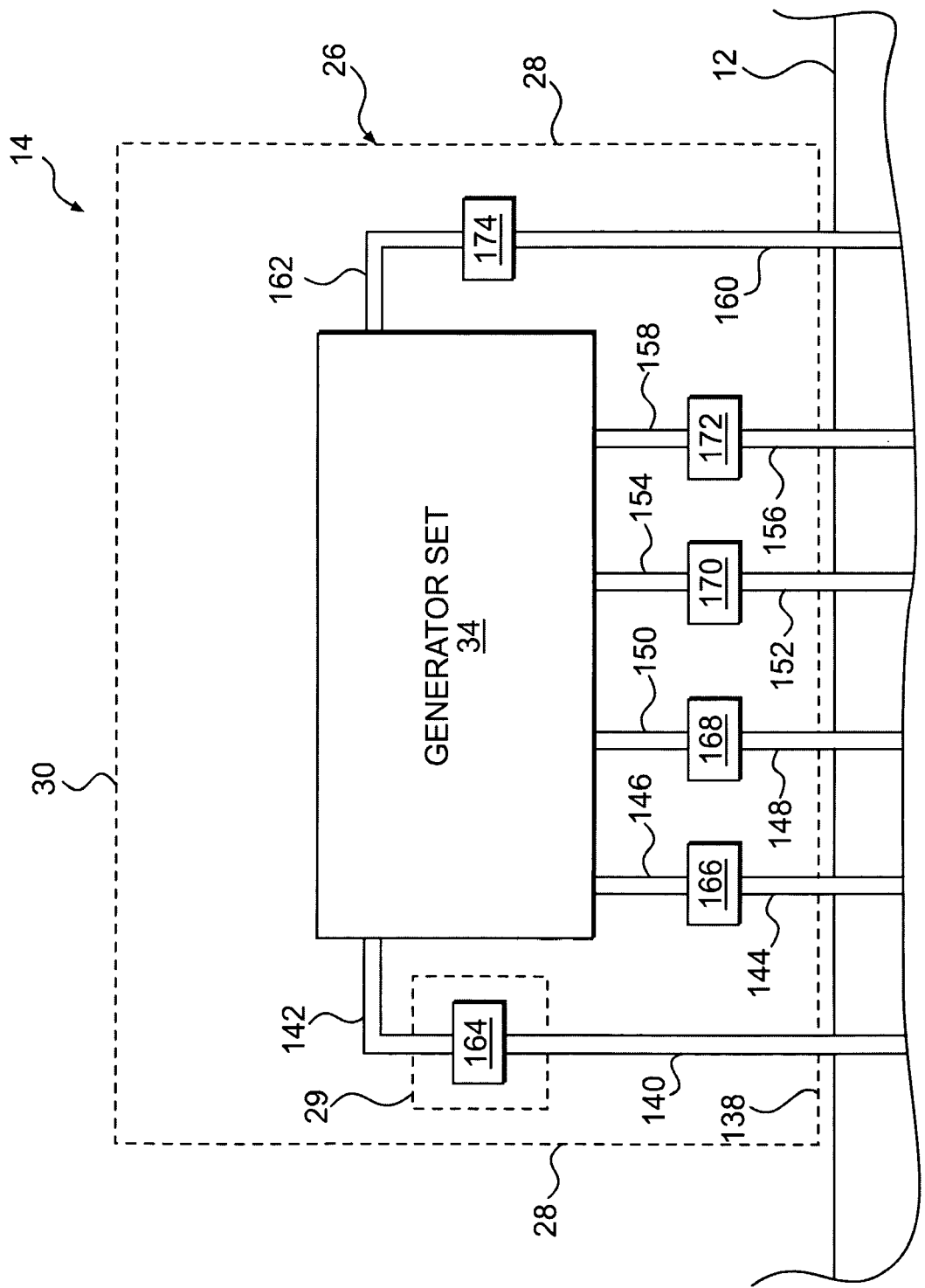
FIG. 6 is a schematic illustration of the power module of FIG. 1 including connection lines between the power module and the locomotive.

As shown in FIG. 6, power module 14 may include one or more connection lines connected to locomotive 10 to transmit energy, material, and/or information between power module 14 and locomotive 10. Connection lines from locomotive 10 may pass through platform 12 and enter power module 14 through a bottom portion 138 of power module 14 and connect to generator set 34. In an exemplary embodiment, a locomotive fuel supply line 140 may connect to a power module fuel supply line 142 via a fuel supply line connector 164, a locomotive air supply line 144 may be connect to a power module air supply line 146 via an air supply line connector 166, a locomotive traction power line 148 (e.g., a direct current power line) may connect to a power module traction power line 150 via a traction power line connector 168, a locomotive accessory power line 152 (e.g., an alternating current power line) may connect to a power module accessory power line 154 via an accessory power line connector 170, a locomotive battery power line 156 may connect to a power module battery power line 158 via a battery power line connector 172, and a locomotive control wiring line 160 may connect to power module control wiring line 162 via a control wiring connector 174. It is contemplated that locomotive 10 and power module 14 may include any type or number of connection lines sufficient to permit power module 14 to be operatively connected to locomotive 10. It is contemplated that power module may include a rectifier (shown as auxiliary component 40 in FIG. 2) located, for example, within enclosure 26 to transfer AC power produced by generator 38 into DC power for receipt by traction motors (not shown) through traction power lines 148, 150.

Connectors 164, 166, 168, 170, 172, 174 may include various types of connectors, including, for example, a hose quick disconnect connector (e.g., connecting fuel supply lines 140, 142), a hose screw-on connector (e.g., connecting air supply lines 144, 146), a bolt-on cable lug connector (e.g., connecting traction power lines 148, 150, accessory power lines 152, 154, and battery power lines 156, 158), and a wiring connector (e.g., connecting control wiring lines 160, 162). While the above listed connector types may be implemented in the exemplary embodiment, it is contemplated that the connection lines of power module 14 may include any type or number of connectors sufficient to connect power module 14 to locomotive 10. During installation of power module 14 on locomotive 10, one or more of the connection lines may be connected via a corresponding connector between power module 14 and locomotive 10. Likewise, during removal of power module 14 from locomotive 10, one or more of the connection lines may be disconnected via a corresponding connector between power module 14 and locomotive 10. In order to access one or more connectors 164, 166, 168, 170, 172, 174, an operator may use one or more wall access passages 29. For example, an operator may access fuel supply connector 164, to connect or disconnect locomotive fuel supply line 140 to power module fuel supply line 142, via first engine access passage 100.

INDUSTRIAL APPLICABILITY

The power module may be applicable to any power system mounted on a mobile machine. The disclosed power module includes features permitting versatility for accessing and/or moving one or more components of the power module. Further, the power module may be used in cooperation and interchangeable with similar power modules on a common locomotive.

At times, one or more power modules 14 positioned on platform 12 of locomotive 10 may require maintenance, inspection, and/or repair (hereinafter generically referenced as "service"). In order to permit service of power module 14, access may be needed to a component (e.g., frame 32, engine 36, generator 38) within power module 14. That is, an operator may seek access inside enclosure 26 through access passages, for example, through wall access passages 100, 102, 104, 106, 108, 110 and roof access passages 122, 124, 130. For example, in a situation when engine 36 is in need of service, an operator may access engine 36 through first engine access passage 100 of first longitudinal wall 92, for example, by opening one or more of hinged doors 112.

For some maintenance operations, access passages 100, 102, 104, 106, 108, 110, 122, 124, and 130 may not be sufficiently sized and/or conveniently located. In circumstances requiring such maintenance operations, one or more portions of enclosure 26 may be removed. For example, an operator may remove one or more roof sections 114, 116, 118; roof structure 30 in its entirety (i.e., roof sections 114, 116, 118); one or more walls 92, 94, 96, 98; or enclosure 26 in its entirety (i.e., roof structure 30 and walls 92, 94, 96, 98).

When sufficient access to power module 14 is not available through one or more wall access passages 100, 102, 104, 106, 108, 110, it is contemplated that one or more walls 92, 94, 96, 98 may be removed from frame 32. For example, in a situation when generator 38 is in need of service from the side, it is contemplated that second longitudinal wall 94 may be removed by disconnecting second longitudinal wall 94 from frame 32 and roof structure 30 via one or more fasteners (not shown) to provide greater access to generator 38.

Similarly, when sufficient access to power module 14 is not available through one or more of roof access passages 122, 124, and 130, it is contemplated that one or more roof sections 114, 116, 118 may be removed from frame 32. For example, in a situation when engine 36 is in need of service from above, it is contemplated that first end roof section 114 may be removed by disconnecting first end roof section 114 from all other connections securing first end roof section 114 to frame 32. It is contemplated that the overhead lift may be used to lift and move first end roof section 114 when the overhead lift is engaged to one or more roof section lifting eyes 136 and/or one or more enclosure lifting eyes 134. When additional roof access is needed, it also contemplated that more than one roof section (e.g., first end roof section 114 and central roof section 116) or roof structure 30 in its entirety may be removed. In situations when roof structure 30 in its entirety may be removed, the overhead lift may be used to lift and move roof structure 30 via one or more enclosure lifting eyes 134 after disconnecting roof structure 30 from frame 32.

In situations when even greater access is needed for service, enclosure 26 in its entirety may be removed with the overhead lift after disconnecting enclosure from frame 32. That is, once enclosure 26 is removed (FIG. 2), an operator may have unfettered access to components within power module 14.

Since some service operations may be labor intensive and time consuming, it may be desirable to remove a power module 14 from locomotive 10 in order to complete service of that power module 14. In order to permit removal of power module 14 from locomotive 10, connection lines (e.g., fuel lines and power lines) between locomotive 10 and power module 14 may be disconnected. Further, one or more fasteners (not shown) securing frame 32 to platform 12 may be disconnected. Once power module 14 is no longer tethered to platform 12, one of various types of lifting machines (e.g., fork lift and overhead lift) may be connected to a corresponding type of lifting element (e.g., first and second fork tubes 64, 66 and frame lifting eyes 86) to aid lifting power module 14 from platform 12. For example, the forklift may engage first and second fork tubes 64, 66 to lift power module 14 from platform 12. Alternatively, the overhead lift may engage one or more of frame lifting eyes 86 to lift power module 14 from platform 12. In situations when enclosure 26 is mounted on frame 26, an operator may connect the overhead lift to each of frame lifting eyes 86 via frame access passages 130 (FIG. 5). Since different types of lifting machines may be used to move power module 14, locomotive 10 may have reduced downtime when a particular type of lifting machine is unavailable.

In order to reduce downtime of locomotive 10 when one or more power module 14 are in need of service, each power module 14 requiring service may be removed from platform 12 and replaced with a waiting power module 14. Thus, locomotive 10 may be brought back into operation without waiting for completion of the required service to the power modules 14. For example, once the power module 14 requiring service is removed from locomotive 10, the power module 14 requiring service may be loaded on a flatbed truck and transported to a maintenance facility for completion of the service operation. As shown in FIG. 1, locomotive 10 may include, for example, three power modules 14. Each of the three power modules 14 may include a similar interchangeable design (e.g., similar size, components, connections), such that each of power modules 14 may be replaced with another similar power module 14. Hence, one or more of power modules 14 may be replaced with a substantially similar power module when one or more of power modules 14 is in need of service. In other words, when only one power module 14 is in need of service, only that particular power module 14 may need to be replaced while the other power modules 14, not in need of service, remain operational on locomotive 10.

The disclosed power module 14 may reduce the amount of downtime for locomotive 10 when service, inspection, and/or repair of power module 14 is needed, based on the versatility and modularity of its design. Power module 14 may include numerous operator access points and may include a plurality of different types of lifting elements (e.g., first and second fork tubes 64, 66 and frame lifting eyes 86), which may provide versatility in the type of lifting machine (e.g., forklift and overhead lift) that may lift power module 14.

It will be apparent to those skilled in the art that various modifications and variations can be made to the disclosed power module without departing from the scope of the disclosure. Other embodiments of the power module will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A power module for a locomotive, the power module comprising:
   a frame including a plurality of lifting elements, the plurality of lifting elements including at least one fork lifting element and at least one frame lifting eye, the at least one frame lifting eye being positioned on a top structure of the frame;
   a generator set supported by the frame; and
   an enclosure attached to the frame and enclosing the generator set, the enclosure including a plurality of walls and a roof structure, wherein the roof structure includes at least one frame access passage covered by a door that may be opened to provide access to the at least one frame lifting eye.

2. The power module of claim 1, wherein the frame includes a base structure, and the base structure includes the at least one fork lifting element.

3. The power module of claim 2, wherein the at least one fork lifting element includes a fork tube.

4. The power module of claim 1, wherein the top structure includes a plurality of frame lifting eyes.

5. The power module of claim 4, wherein each of the plurality of frame lifting eyes include a plate connected to the top structure and a passage through the plate.

6. The power module of claim 1, wherein the enclosure includes at least one enclosure lifting eye.

7. The power module of claim 1, wherein the roof structure includes a plurality of separately removable roof sections.

8. The power module of claim 7, wherein each of the plurality of roof sections includes at least one roof section lifting eye.

9. The power module of claim 1, wherein the enclosure is removable from the frame with the plurality of walls attached to the roof structure.

10. A method of servicing a power module for a locomotive, the power module including a generator set, comprising;
    disconnecting an enclosure covering the generator set from a frame of the power module, the enclosure including a plurality of walls, a roof structure, and one or more enclosure lifting eyes positioned on an exposed surface of the roof structure, the frame including at least one frame lifting eye positioned on a top structure of the frame, the at least one frame lifting eye being a plate with a passage therethrough, the enclosure including a covered access passage that may be opened to provide access to the at least one frame lifting eye; and
    moving the enclosure relative to the frame as a single unit including the plurality of walls and the roof structure, wherein moving the enclosure includes lifting the enclosure as one piece using the one or more enclosure lifting eyes, and moving the enclosure off the frame.

11. The method of claim 10, wherein moving the enclosure includes removing the enclosure from the power module to expose the generator set.

12. The method of claim 10, wherein lifting the enclosure includes lifting the enclosure using a plurality of enclosure lifting eyes.

13. The method of claim 12, wherein moving the enclosure includes moving the enclosure with an overhead lift.

14. A locomotive comprising:
    a platform positioned above a plurality of wheels; and
    a plurality of power modules removably positioned on the platform, each of the plurality of power modules including a frame supporting a generator set and an enclosure covering the generator set, wherein each frame includes a pair of fork lifting tubes and a plurality of frame lifting eyes, wherein the enclosure of each of the plurality of power modules include a plurality of access passages that provide access to a corresponding one of the plurality of frame lifting eyes.

15. The locomotive of claim 14, further including a plurality of enclosure lifting eyes connected to the enclosure.

16. The locomotive of claim 15, wherein the enclosure is removable from the frame via the plurality of enclosure lifting eyes.

17. The locomotive of claim 14, wherein the plurality of power modules includes a first power module and a second power module, and a dynamic brake assembly is positioned between the first power module and the second power module.

18. The locomotive of claim 15, wherein the plurality of enclosure lifting eyes include at least four enclosure lifting eyes positioned on a top surface of the enclosure.

19. The power module of claim 1, wherein the at least one frame lifting eye includes a plate connected to the top structure with a passage through the plate.

* * * * *